United States Patent
Lord et al.

(10) Patent No.: US 9,038,154 B2
(45) Date of Patent: May 19, 2015

(54) TOKEN REGISTRATION

(75) Inventors: Robert B. Lord, Mountain View, CA (US); Robert Relyea, Mountain View, CA (US); Nang Kon Kwan, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1582 days.

(21) Appl. No.: 11/469,479

(22) Filed: Aug. 31, 2006

(65) Prior Publication Data
US 2008/0059793 A1  Mar. 6, 2008

(51) Int. Cl.
*G06F 21/34* (2013.01)
*H04L 29/06* (2006.01)
*G06Q 20/34* (2012.01)

(52) U.S. Cl.
CPC .............. *G06F 21/34* (2013.01); *G06Q 20/34* (2013.01); *H04L 63/0807* (2013.01); *H04L 63/0823* (2013.01); *H04L 63/0853* (2013.01)

(58) Field of Classification Search
USPC ......................................................... 726/20
See application file for complete search history.

(56) References Cited

U.S. PATENT DOCUMENTS

| | | | |
|---|---|---|---|
| 4,108,367 A | 8/1978 | Hannan | |
| 4,849,614 A | 7/1989 | Watanabe et al. | |
| 4,924,330 A | 5/1990 | Seamons et al. | |
| 5,247,163 A | 9/1993 | Ohno et al. | |
| 5,355,414 A | 10/1994 | Hale et al. | |
| 5,499,371 A | 3/1996 | Henninger et al. | |
| 5,594,227 A | 1/1997 | Deo | |
| 5,631,961 A | 5/1997 | Mills et al. | |
| 5,666,415 A | 9/1997 | Kaufman | |
| 5,721,781 A | 2/1998 | Deo et al. | |
| 5,745,576 A | 4/1998 | Abraham et al. | |
| 5,745,678 A | 4/1998 | Herzberg et al. | |
| 5,768,373 A | 6/1998 | Lohstroh et al. | |
| 5,862,310 A | 1/1999 | Crawford et al. | |
| 5,923,884 A | 7/1999 | Peyret et al. | |
| 5,937,066 A | 8/1999 | Gennaro et al. | |
| 5,943,423 A | 8/1999 | Muftic | |
| 5,991,411 A | 11/1999 | Kaufman et al. | |
| 5,991,882 A | 11/1999 | O'Connell | |
| 6,005,942 A | 12/1999 | Chan et al. | |
| 6,005,945 A | 12/1999 | Whitehouse | |
| 6,011,847 A | 1/2000 | Follendore, III | |
| 6,016,476 A | 1/2000 | Maes et al. | |
| 6,044,155 A | 3/2000 | Thomlinson et al. | |

(Continued)

FOREIGN PATENT DOCUMENTS

WO          9724831        7/1997
WO     WO 9965175 A1 *  12/1999

(Continued)

OTHER PUBLICATIONS

ATM and Credit Card Notification, Feb. 2005 (internet archive) pp. 1-2, www.thereareplaces.com/infgdes/money.atmnotif.htm.

(Continued)

*Primary Examiner* — Alexander Lagor
(74) *Attorney, Agent, or Firm* — Lowenstein Sandler LLP

(57) ABSTRACT

An embodiment relates generally to a method of binding a token to a user. The method includes receiving a token embedded with an address and inserting the token into a computer. The method also includes connecting to the address stored on the token and binding a user to the token based on information from the address.

18 Claims, 6 Drawing Sheets

(56) References Cited

U.S. PATENT DOCUMENTS

| | | | |
|---|---|---|---|
| 6,072,876 A | 6/2000 | Obata et al. | |
| 6,141,420 A | 10/2000 | Vanstone et al. | |
| 6,178,507 B1 | 1/2001 | Vanstone | |
| 6,179,205 B1 | 1/2001 | Sloan | |
| 6,226,744 B1 | 5/2001 | Murphy et al. | |
| 6,377,825 B1 | 4/2002 | Kennedy et al. | |
| 6,490,680 B1 | 12/2002 | Scheidt et al. | |
| 6,502,108 B1 | 12/2002 | Day et al. | |
| 6,539,093 B1 | 3/2003 | Asad et al. | |
| 6,636,975 B1 | 10/2003 | Khidekel et al. | |
| 6,643,701 B1 | 11/2003 | Aziz et al. | |
| 6,687,190 B2 | 2/2004 | Momich et al. | |
| 6,691,137 B1 | 2/2004 | Kishi | |
| 6,698,654 B1 | 3/2004 | Zuppicich | |
| 6,734,886 B1 | 5/2004 | Hagan et al. | |
| 6,760,752 B1 | 7/2004 | Liu et al. | |
| 6,804,687 B2 | 10/2004 | Sampson | |
| 6,819,766 B1 | 11/2004 | Weidong | |
| 6,826,686 B1 | 11/2004 | Peyravian | |
| 6,829,712 B1 | 12/2004 | Madoukh | |
| 6,880,037 B2 | 4/2005 | Boyer | |
| 6,880,084 B1 | 4/2005 | Brittenham et al. | |
| 6,898,605 B2 | 5/2005 | Constantino | |
| 6,898,714 B1 | 5/2005 | Nadalin et al. | |
| 6,931,133 B2 | 8/2005 | Andrews et al. | |
| 6,941,326 B2 | 9/2005 | Kadyk et al. | |
| 6,970,970 B2 | 11/2005 | Jung et al. | |
| 6,978,933 B2 | 12/2005 | Yap et al. | |
| 6,986,040 B1 | 1/2006 | Kramer et al. | |
| 7,007,105 B1 | 2/2006 | Sullivan et al. | |
| 7,010,600 B1 | 3/2006 | Prasad et al. | |
| 7,050,589 B2 | 5/2006 | Kwan | |
| 7,051,213 B1 | 5/2006 | Kobayashi et al. | |
| 7,085,386 B2 | 8/2006 | Audebert et al. | |
| 7,114,028 B1 | 9/2006 | Green et al. | |
| 7,156,302 B2 | 1/2007 | Yap et al. | |
| 7,159,763 B2 | 1/2007 | Yap et al. | |
| 7,185,018 B2 | 2/2007 | Archbold et al. | |
| 7,251,728 B2 | 7/2007 | Toh et al. | |
| 7,278,581 B2 | 10/2007 | Ong | |
| 7,299,364 B2 | 11/2007 | Noble et al. | |
| 7,302,585 B1 | 11/2007 | Proudler et al. | |
| 7,356,688 B1 | 4/2008 | Wang | |
| 7,374,099 B2 | 5/2008 | de Jong | |
| 7,386,705 B2 | 6/2008 | Low et al. | |
| 7,437,757 B2 | 10/2008 | Holdsworth | |
| 7,451,921 B2 | 11/2008 | Dowling et al. | |
| 7,475,250 B2 | 1/2009 | Aull et al. | |
| 7,475,256 B2 | 1/2009 | Cook | |
| 7,480,384 B2 | 1/2009 | Peyravian et al. | |
| 7,502,793 B2 | 3/2009 | Snible et al. | |
| 7,571,321 B2 | 8/2009 | Appenzeller et al. | |
| 7,602,910 B2 | 10/2009 | Johansson et al. | |
| 7,702,917 B2 | 4/2010 | Tevosyan et al. | |
| 7,769,996 B2 | 8/2010 | Randle et al. | |
| 7,822,209 B2 | 10/2010 | Fu et al. | |
| 7,860,243 B2 | 12/2010 | Zheng et al. | |
| 2001/0008012 A1 | 7/2001 | Kausik | |
| 2001/0036276 A1 | 11/2001 | Ober et al. | |
| 2001/0054148 A1 | 12/2001 | Hoornaert et al. | |
| 2002/0004816 A1 | 1/2002 | Vange et al. | |
| 2002/0007351 A1 | 1/2002 | Hillegass et al. | |
| 2002/0007359 A1 | 1/2002 | Nguyen | |
| 2002/0010679 A1 | 1/2002 | Felsher | |
| 2002/0029343 A1 | 3/2002 | Kurita | |
| 2002/0056044 A1 | 5/2002 | Andersson | |
| 2002/0059144 A1 | 5/2002 | Meffert et al. | |
| 2002/0064095 A1 | 5/2002 | Momich et al. | |
| 2002/0080958 A1 | 6/2002 | Ober et al. | |
| 2002/0099727 A1 | 7/2002 | Kadyk et al. | |
| 2002/0112156 A1 | 8/2002 | Gien et al. | |
| 2002/0120842 A1 | 8/2002 | Bragstad et al. | |
| 2002/0133707 A1 | 9/2002 | Newcombe | |
| 2002/0171546 A1 | 11/2002 | Evans et al. | |
| 2002/0184149 A1* | 12/2002 | Jones | 705/41 |
| 2002/0188848 A1 | 12/2002 | Buttiker | |
| 2003/0005291 A1* | 1/2003 | Burn | 713/159 |
| 2003/0012386 A1 | 1/2003 | Kim et al. | |
| 2003/0028664 A1 | 2/2003 | Tan et al. | |
| 2003/0035548 A1 | 2/2003 | Kwan | |
| 2003/0056099 A1 | 3/2003 | Asanoma et al. | |
| 2003/0075610 A1 | 4/2003 | Ong | |
| 2003/0093695 A1 | 5/2003 | Dutta | |
| 2003/0115455 A1 | 6/2003 | Aull et al. | |
| 2003/0115466 A1 | 6/2003 | Aull et al. | |
| 2003/0115467 A1 | 6/2003 | Aull et al. | |
| 2003/0115468 A1 | 6/2003 | Aull et al. | |
| 2003/0167399 A1 | 9/2003 | Audebert et al. | |
| 2003/0172034 A1 | 9/2003 | Schneck et al. | |
| 2004/0042620 A1 | 3/2004 | Andrews et al. | |
| 2004/0053642 A1* | 3/2004 | Sandberg et al. | 455/558 |
| 2004/0066274 A1 | 4/2004 | Bailey | |
| 2004/0088562 A1 | 5/2004 | Vassilev et al. | |
| 2004/0096055 A1 | 5/2004 | Williams et al. | |
| 2004/0103324 A1 | 5/2004 | Band | |
| 2004/0103325 A1 | 5/2004 | Priebatsch | |
| 2004/0120525 A1 | 6/2004 | Miskimmin et al. | |
| 2004/0144840 A1* | 7/2004 | Lee et al. | 235/380 |
| 2004/0146163 A1 | 7/2004 | Asokan et al. | |
| 2004/0153451 A1 | 8/2004 | Phillips et al. | |
| 2004/0162786 A1 | 8/2004 | Cross et al. | |
| 2004/0230831 A1 | 11/2004 | Spelman et al. | |
| 2005/0022123 A1 | 1/2005 | Costantino | |
| 2005/0033703 A1* | 2/2005 | Holdsworth | 705/67 |
| 2005/0109841 A1 | 5/2005 | Ryan et al. | |
| 2005/0114673 A1 | 5/2005 | Raikar et al. | |
| 2005/0119978 A1 | 6/2005 | Ates | |
| 2005/0123142 A1 | 6/2005 | Freeman et al. | |
| 2005/0138386 A1 | 6/2005 | Le Saint | |
| 2005/0138390 A1 | 6/2005 | Adams et al. | |
| 2005/0144312 A1 | 6/2005 | Kadyk et al. | |
| 2005/0184163 A1 | 8/2005 | de Jong | |
| 2005/0184164 A1 | 8/2005 | de Jong | |
| 2005/0184165 A1 | 8/2005 | de Jong | |
| 2005/0188202 A1* | 8/2005 | Popp | 713/175 |
| 2005/0188360 A1 | 8/2005 | de Jong | |
| 2005/0216732 A1* | 9/2005 | Kipnis et al. | 713/155 |
| 2005/0262361 A1 | 11/2005 | Thibadeau | |
| 2005/0279827 A1 | 12/2005 | Mascavage et al. | |
| 2005/0289652 A1 | 12/2005 | Sharma et al. | |
| 2006/0005028 A1 | 1/2006 | Labaton | |
| 2006/0010325 A1 | 1/2006 | Liu et al. | |
| 2006/0015933 A1 | 1/2006 | Ballinger et al. | |
| 2006/0036868 A1 | 2/2006 | Cicchitto | |
| 2006/0043164 A1 | 3/2006 | Dowling et al. | |
| 2006/0072747 A1 | 4/2006 | Wood et al. | |
| 2006/0073812 A1 | 4/2006 | Punaganti Venkata et al. | |
| 2006/0075133 A1 | 4/2006 | Kakivaya et al. | |
| 2006/0075486 A1 | 4/2006 | Lin et al. | |
| 2006/0101111 A1 | 5/2006 | Bouse et al. | |
| 2006/0101506 A1 | 5/2006 | Gallo et al. | |
| 2006/0173848 A1 | 8/2006 | Peterson et al. | |
| 2006/0174104 A1 | 8/2006 | Crichton et al. | |
| 2006/0206932 A1 | 9/2006 | Chong | |
| 2006/0208066 A1 | 9/2006 | Finn et al. | |
| 2006/0226243 A1 | 10/2006 | Dariel | |
| 2006/0291664 A1 | 12/2006 | Suarez et al. | |
| 2006/0294583 A1 | 12/2006 | Cowburn et al. | |
| 2007/0014416 A1 | 1/2007 | Rivera et al. | |
| 2007/0074034 A1 | 3/2007 | Adams et al. | |
| 2007/0112721 A1 | 5/2007 | Archbold et al. | |
| 2007/0113267 A1 | 5/2007 | Iwanski et al. | |
| 2007/0113271 A1 | 5/2007 | Pleunis | |
| 2007/0118891 A1 | 5/2007 | Buer | |
| 2007/0162967 A1 | 7/2007 | de Jong et al. | |
| 2007/0169084 A1 | 7/2007 | Frank et al. | |
| 2007/0189534 A1 | 8/2007 | Wood et al. | |
| 2007/0204333 A1 | 8/2007 | Lear et al. | |
| 2007/0230706 A1 | 10/2007 | Youn | |
| 2007/0271601 A1 | 11/2007 | Pomerantz | |
| 2007/0277032 A1 | 11/2007 | Relyea | |
| 2007/0280483 A1 | 12/2007 | Fu | |
| 2007/0282881 A1 | 12/2007 | Relyea | |
| 2007/0283163 A1 | 12/2007 | Relyea | |

(56) References Cited

U.S. PATENT DOCUMENTS

| | | |
|---|---|---|
| 2007/0283427 A1 | 12/2007 | Gupta et al. |
| 2007/0288745 A1 | 12/2007 | Kwan |
| 2007/0288747 A1 | 12/2007 | Kwan |
| 2008/0005339 A1 | 1/2008 | Kwan |
| 2008/0019526 A1 | 1/2008 | Fu |
| 2008/0022086 A1 | 1/2008 | Ho |
| 2008/0022088 A1 | 1/2008 | Fu et al. |
| 2008/0022121 A1 | 1/2008 | Fu et al. |
| 2008/0022122 A1 | 1/2008 | Parkinson et al. |
| 2008/0022128 A1 | 1/2008 | Proudler et al. |
| 2008/0034216 A1 | 2/2008 | Law |
| 2008/0046982 A1 | 2/2008 | Parkinson |
| 2008/0056496 A1 | 3/2008 | Parkinson |
| 2008/0059790 A1 | 3/2008 | Parkinson |
| 2008/0069338 A1 | 3/2008 | Relyea |
| 2008/0069341 A1 | 3/2008 | Relyea |
| 2008/0072283 A1 | 3/2008 | Relyea |
| 2008/0077794 A1 | 3/2008 | Arnold et al. |
| 2008/0077803 A1 | 3/2008 | Leach et al. |
| 2008/0133514 A1 | 6/2008 | Relyea |
| 2008/0148047 A1 | 6/2008 | Appenzeller et al. |
| 2008/0189543 A1 | 8/2008 | Parkinson |
| 2008/0209224 A1 | 8/2008 | Lord |
| 2008/0209225 A1 | 8/2008 | Lord |
| 2008/0229401 A1 | 9/2008 | Magne |
| 2009/0003608 A1 | 1/2009 | Lee et al. |
| 2009/0133107 A1 | 5/2009 | Thoursie |
| 2010/0313027 A1 | 12/2010 | Taylor |

FOREIGN PATENT DOCUMENTS

| | | |
|---|---|---|
| WO | 0048064 A1 | 8/2000 |
| WO | 2007096590 A1 | 8/2007 |

OTHER PUBLICATIONS

AMD Announces Specification for Open Platform Management Architecture, Feb. 28, 2005, pp. 1-2, http://www.thefreelibrary.com/AMD+Announces+Specification+for+Open+Platform+Management+Architecture-a0129342307.

Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.

Schneier, "Applied Cryptography: Protocols, Algorithms, and Source Code in C", 1996, John Wiley & Sons, Inc., Second Edition, pp. 455-456.

Zuccherato, Robert, Elliptic Curve Cryptography Support in Entrust, May 9, 2000.

Red Hat Certificate System, http://www.redhat.com/f/pdf/rhas/DirSecProductSheetCertificateSystem.pdf, Jun. 2005.

PKCS#11 v2.20: Cryptographic Token Interface Standard, RSA Laboratories, Jun. 28, 2004 (see, e.g. Chapter 10, Objects) (see www.rsasecurity.com, 407 pages).

Cryptographic Message Syntax, R. Housley, Request for Comments (RFC) 2630, Network Working Group, The Internet Society, Jun. 1999.

Balfanz (Dirk ABalfanz, "Access Control for Ad-Hoc Collaboration", Princeton University Jan. 2001).

Schneier, Bruce. Applied Cryptography, Second Edton, 1996 John Wiley and Sons, pp. 480-481.

* cited by examiner

TOKEN REGISTRATION

FIELD

This invention generally relates to secure distributed systems. More particularly, the invention relates to a method and system for enrolling a token.

DESCRIPTION OF THE RELATED ART

Smart cards are not merely a piece of plastic with a strip of magnetic material. Smart cards also store and process information. Smart cards are storage devices with the core mechanics to facilitate communication with a reader or coupler. They have file system configurations and the ability to be partitioned into public and private spaces that can be made available or locked. They also have segregated areas for protected information, such as certificates, e-purses, and entire operating systems. In addition to traditional data storage states, such as read-only and read/write, some vendors are working with sub-states best described as "add only" and "update only."

The physical characteristics of smart cards are governed by international standards. For example, the size of a card is covered by ISO-7810, ISO-7816 and subsequent standards cover manufacturing parameters, physical and electrical characteristics, location of the contact points, communication protocols, data storage, and more. Data layout and format, however, can vary from vendor to vendor.

Smart cards are a way to increase security especially for enterprise systems. Enterprise system often contain valuable information such as financial data, personnel records, strategies, etc., that may be critical for the entity administrating the enterprise system. Moreover, smart cards may offer a method to control access to data within the enterprise systems. Accordingly, the reasons to use smart card are plentiful.

However, there are drawbacks and disadvantages for the system administrator in the use of smartcards. For example, if the system administrator has a large number of users over a wide geographic area to support, the distribution and subsequent initialization of the tokens to each user may become time-consuming and a logistical nightmare, especially if there are time deadlines. Accordingly, there is a need for enrolling a large number of geographically diverse users securely.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Embodiments generally relate to a method of enrolling tokens. More particularly, potential users of tokens have installed a security client on their computing platforms. A certificate server may be configured to initialize a set of tokens. Alternatively, the tokens may be initialized at the manufacturer of the tokens. During the initialization process, the certificate server injects an identifier and a universal resource locater (URL) of a website that the installed security client will use in enrollment. It is worthy to note that the tokens have not yet been bound to a user.

After the tokens have been distributed to a group of users, a selected user may insert the received token into a computing platform. The security client may be configured to detect a state of the token. If the security client determines that the token has not bound to the selected user, the security client may be configured to retrieve the previously injected URL from the token. The security client may then connect to the site identified by the URL and load the contents from the site. The security client may render the content, usually as a web-enrollment form requesting information such as name, address, and other personal information from a user. The security client may use the entered information to verify or authenticate the user. The security client may then request that the certificates and keys be generated for the token. The security client may then inject the received certificate(s) and key(s) to bind the token to the selected user.

For simplicity and illustrative purposes, the principles of the present invention are described by referring mainly to exemplary embodiments thereof. However, one of ordinary skill in the art would readily recognize that the same principles are equally applicable to, and can be implemented in, all types of secure systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Figure 1:
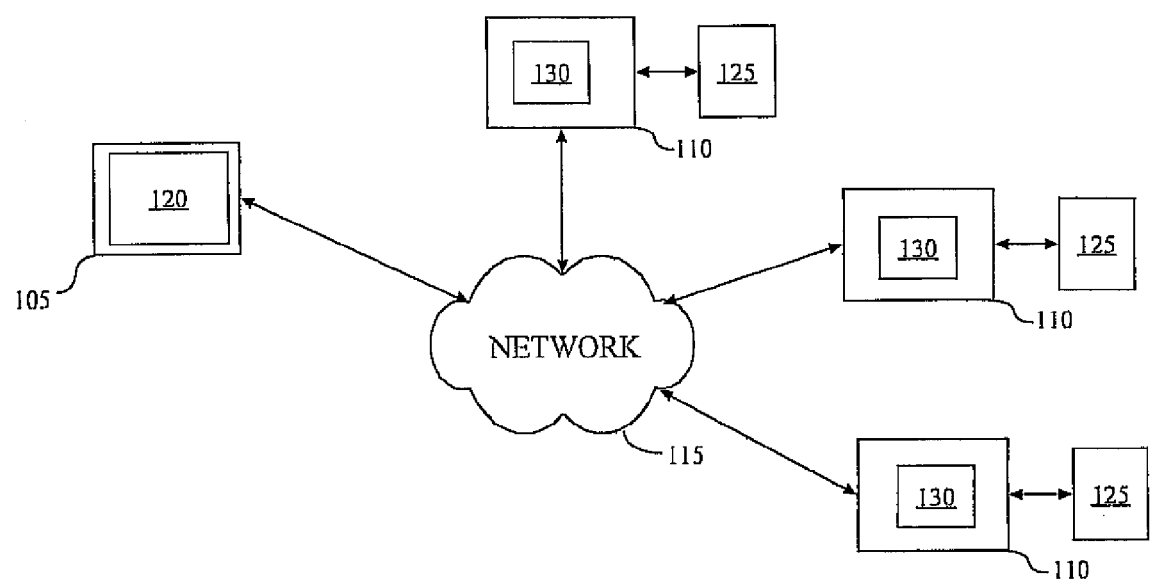
FIG. 1 illustrates an exemplary system in accordance with an embodiment.

FIG. 1 illustrates an exemplary secure system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the secure system 100 includes a server 105, clients 110 and a local network 115. The server 105 may be a computing machine or platform configured to execute a certificate management system 120 through a multiple user operating system (not shown) in conjunction with the clients 110. The server 105 may be implemented with server platforms as known to those skilled in the art from Intel, Advanced Micro Devices, Hewlett-Packard, etc.

The server 105 may interact with the clients over the local network 115. The local network 115 may be a local area network implementing an established network protocol such as Ethernet, token ring, FDDI, etc. The local network 115 provides a communication channel for the server 105 and clients 110 to exchange data and commands.

The clients 110 may be computing machine or platform configured to execute secure and open applications through the multi-user operating system. The clients 110 may be implemented with personal computers, workstations, thin clients, thick clients, or other similar computing platform. The clients 110 may use operating systems such as Linux, Windows, Macintosh or other available operating system.

Each client 110 may be configured to interface with a security device 125. The security device 125 may be configured to act as a gatekeeper to the client 110. More particularly, a user may use a security token, such as a smart card, to access the respective client 110. Each client 110 may have a security client 130 executing to monitor the security device 125.

The security client 130 may be configured to manage the token. More specifically, the security client 130 may enroll the token, recover keys for the token or reset a personal identification number for the token. The security client 130 may also be configured to interface with the certificate management system 120 and act as a proxy for application program data units (APDUs) between the token management system 120 and the token. The security client 130 may be further configured to display user interfaces as the certificate management system 120 directs, i.e., prompting the user for credentials and/or PIN, displaying token status.

Figure 2:
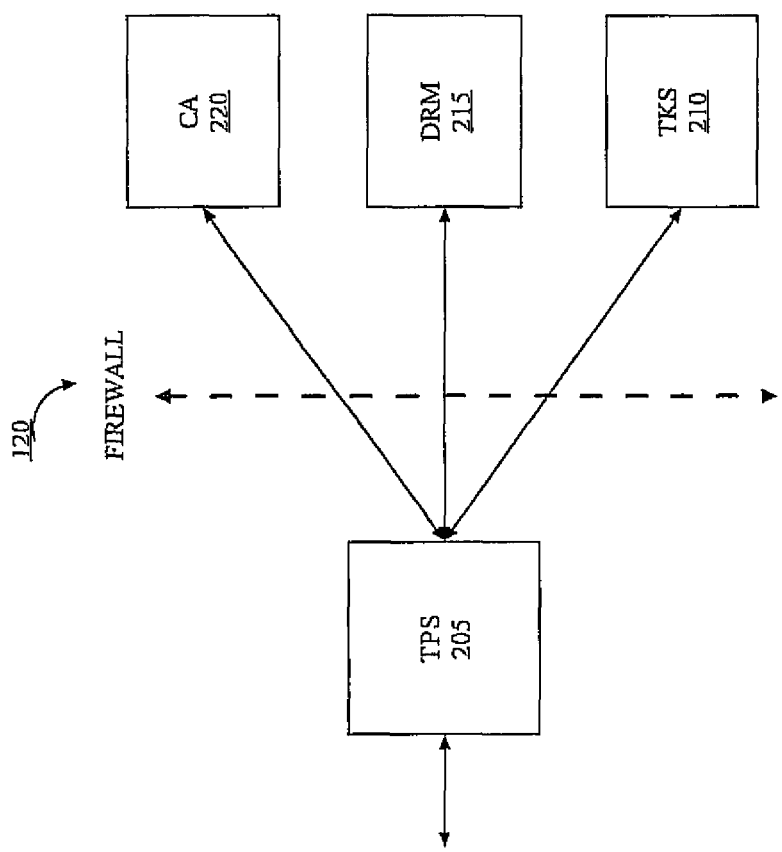
FIG. 2 illustrates a block diagram of a certificate server in accordance with another embodiment.

The certificate management system 120 comprises several modules, as depicted in FIG. 2. FIG. 2 shows an exemplary architecture of the token management system 120 in accordance with another embodiment. It should be readily apparent to those of ordinary skill in the art that the token management system 120 depicted in FIG. 2 represents a generalized schematic illustration and that other components may be added or existing components may be removed or modified. Moreover, the token management system 120 may be implemented using software components, hardware components, or combinations thereof.

As shown in FIG. 2, the certificate management system 120 includes a token processing system (labeled as TPS in FIG. 2) 205, a token key service (TKS) module 210, a data recovery manager (DRM) module 215 and a certificate authority (CA) module 220. The TPS 205 may be configured to act as a registration authority. The TPS 205 may direct the enrollment process. The TPS 205 may also be configured to act as a gateway between security clients 130 and tokens and the modules of the token management system 120.

The TKS module 210 may be configured to maintain master keys for the tokens. The TKS module 210 may also store symmetric keys associated with the token. These keys may be derived from a single master key combined with smart card serial number or identification number, i.e., the CID. The manufacturer of the smart card may store these symmetric keys onto the token. The manufacturer may also forward the single master key to the administrator of the token management system 120, who installs the key into the TKS module 210.

The DRM module 215 may be configured to maintain a database of encrypted subject's private keys, which can be recovered on demand by an appropriate process.

The CA module 220 may be configured to generate X.509 certificates in response to received subject public key information and certificate enrollment requests.

In some embodiments, the administrator of the system 100 may distribute tokens to the users. These tokens are unbound, i.e., the tokens have not been assigned to a particular user. When a user inserts an unbound token into the security device 125, the security client 130 may initiate the enrolling and binding of the inserted token. More specifically, the security client 130 may detect the presence of the token and query the inserted token to determine whether or not the token has been initialized and bound to the user. If the token has been previously initialized, the security client 130 proceeds with logging in the user.

Otherwise, if the security client 130 determines that the inserted token has not been initialized or bound to a user, the security client 130 may be configured to retrieve a universal resource locater ("URL") of a site to begin the process of enrolling the inserted token. In some embodiments, the site referenced by the URL may be located in a secure location provided by the administrator of the system 100. The URL of the secure site may be embedded by the token manufacturer or by the system administrator.

After connecting to the site referenced by the URL using secure protocols, the security client 130 may retrieve information, e.g., an enrollment form, from the secure site and render this information on a display associated with the security client 130. The security client 130 may then transmit the information entered by the user to the certificate management system 120. The certificate management system 120 may authenticate the received information from the security client 130. After authentication is confirmed, the certificate management system 120 may generate at least one key to obtain certificates for the token. The certificate management system 120 may return the generated keys and certificates to the security client 130. The security client 130 may then inject the keys and certificates into the token, thus binding the token to the user.

In other embodiments, if the security client 130 determines that the inserted token has not been initialized or bound to a user, the security client 130 may be configured to retrieve a pointer or reference to a configuration file. The configuration file may have a formatted in an Extensible Markup Language ("XML"), a script or functional language. The configuration file can contain, but not limited to, information such as an enrollment URL, the name of the card issue, the location of other certificate management system 120 servers, configuration information that can control the security client 130 behavior, branding and/or icons to represent the token, etc. The configuration information may represent instructions to verify the status of the token or should the security client 130 launch an application in response to the insertion of the token.

Figure 3:
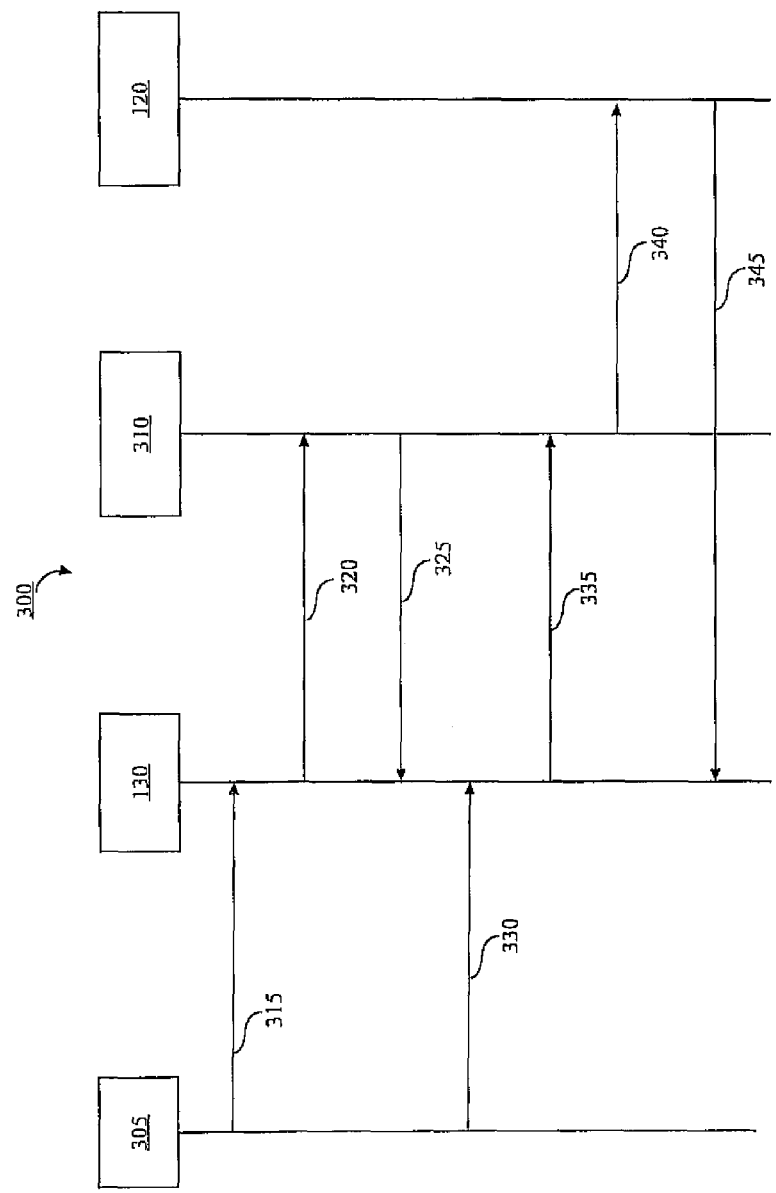
FIG. 3 illustrates a process flow diagram in accordance with yet another embodiment.

FIG. 3 illustrates an exemplary process flow diagram 300 in accordance with yet another embodiment. It should be readily apparent to those of ordinary skill in the art that the process flow diagram 300 depicted in FIG. 3 represents a generalized schematic illustration and that other steps may be added or existing steps may be removed or modified.

The process flow diagram 300 is premised on a situation where the card manufacturer or system administrator has distributed un-initialized tokens to users. The un-initialized token may store a URL or address of a secure site to enroll and bind the token to the user. The users may then initialize their token(s) at their convenience and with minimal involvement of the system administrator or security officer.

As shown in FIG. 3, a user 305 may insert a token in the security device 125, in step 315. The security client 130 may detect the presence of the inserted token. The security client 130 may query the inserted token for a state of initialization or to query to determine whether the token has certificates or cryptographic keys previously instead. If the security client 130 determines that the token already has certificates and keys, the security client 130 may begin logging on the user.

Otherwise, if the security client 130 determines that the token has not been enrolled, the security client 130 may be configured to retrieve the URL from the token and connect to the site (site 310 in FIG. 3) referenced by the URL using secure connection protocols as known to those skilled in the art, in step 320. In other embodiments, the security client 130 may retrieve a configuration file and execute the configuration file per the stored instructions/information therein.

In step 325, the site 310 may return information required to enroll and bind the token to the user. For example, the site 310 may return a HTML enrollment page to the security client 130. The security client 130 may be configured to render the returned information to the user 305. In step 330, the security client 130 may wait for the user 305 to enter the information required by the site 310.

In step 335, the security client 130 may transfer the information entered by the user to the site 310. The site 310 may then generate a request to the certificate management system 120 to generate keys and certificates for the token, in step 340. The generation of keys and certificates can be found in U.S. patent application Ser. No. 11/446,957 entitled "Methods and Systems for Server Side Key Generation," filed on Jun. 6, 2006, commonly assigned, which is hereby incorporated by reference in its entirety.

In step 345, the certificate management system 120 may return the requested keys and certificates to the security client 130 to be injected into the token. Accordingly, the token may be enrolled and bound to the user.

Figure 4:
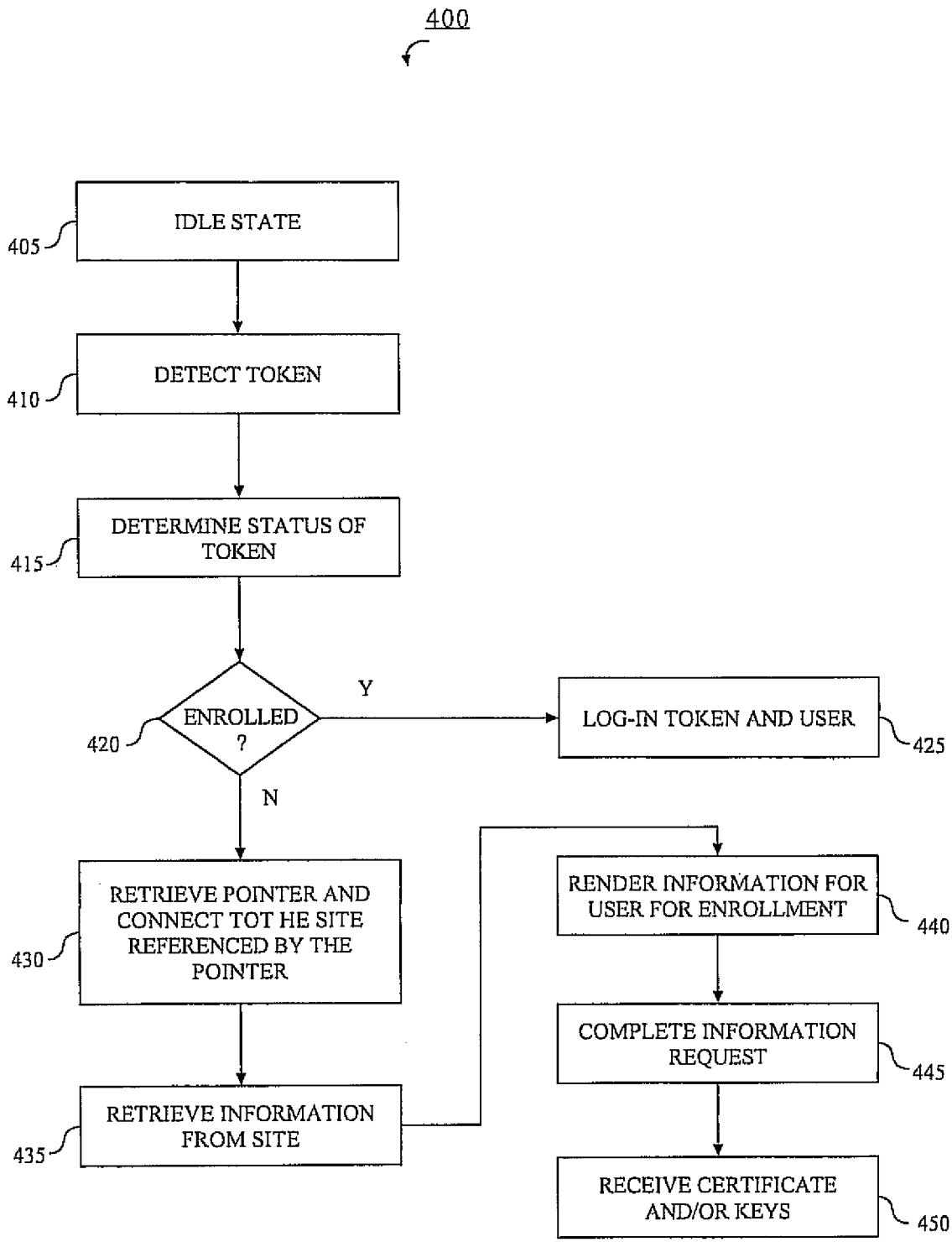
FIG. 4 illustrates a flow diagram in accordance with yet another embodiment.

FIG. 4 illustrates an exemplary flow diagram implemented by the security client 130 in accordance with yet another embodiment. It should be readily apparent to those of ordinary skill in the art that the flow diagram 400 depicted in FIG. 4 represents a generalized schematic illustration and that other steps may be added or existing steps may be removed or modified. Moreover, the implementation of flow diagram 400 may be as computer readable program code in a computer language such as C, C++, PASCAL, etc.

As shown in FIG. 4, the security client 130 may initially be in an idle state, in step 405. The security client 130 may have been invoked during the boot-up process of the client 110. A user may insert a token, e.g., a smartcard, into the security device 125 of the client 110. In step 410, the security client 130 may detect the presence of the inserted token.

In step 415, the security client 130 may determine a status of the token. If the token has already been initialized and bound to a user, i.e., enrolled, in step 420, the security client 130 may be configured to proceed with the log-on procedure of the user and token for the client in step 425.

Otherwise, if the security client 130 determines that the inserted token has not been enrolled, in step 420, the security client 130 may retrieve the previously embedded address or pointer, e.g., a URL, from the token and connect to the site referenced by the URL using secure connection protocols as known to those skilled in the art, in step 430.

In step 435, the security client 130 may retrieve information from the secure site such as a web-enrollment form. The data required by the web-enrollment form may assist in the authentication and verification of the token and the user. Alternatively, the secure site may transmit the web-enrollment form to the security client as part of the handshake between the security client 130 and the secure site.

In step 440, the security client 130 may render the web-enrollment form for the user. The security client 130 may enter an idle state while the user enters the information (not shown). In step 445, the security client 130 may receive an indication that the user has completed entry of the requested data on the web-enrollment form. For example, the user may have activated a "SUBMIT" icon on the web-enrollment form. The security client 130 may also check the web-enrollment form to determine whether all the requested data has been entered. If requested data is complete, the security client 130 may transmit the completed enrollment form to the secure site to begin the enrollment process at the certificate management system 120. The certificate management system 120 may generate the necessary cryptographic keys to request certificates for the inserted token.

In step 450, the security client 130 may be configured to receive the appropriate certificates and cryptographic keys, e.g., PKI, to bind the user to the token. The security client 130 may then inject the received certificates and keys into the token.

Figure 5:
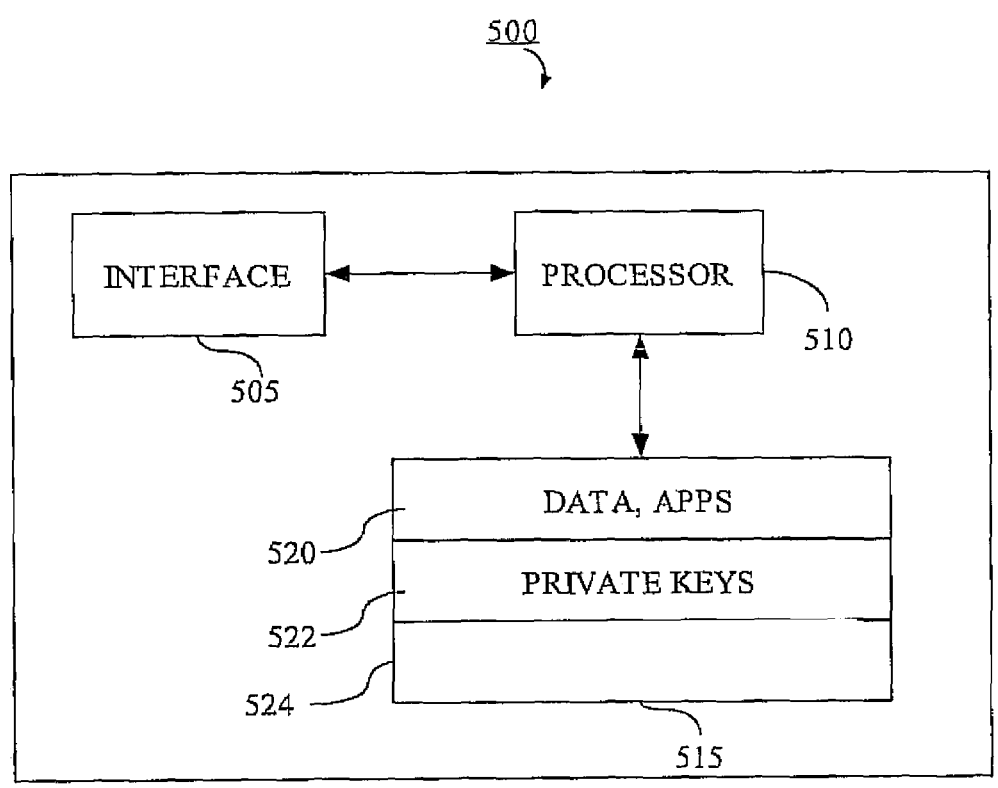
FIG. 5 illustrates an exemplary token in accordance with yet another embodiment.

FIG. 5 illustrates an exemplary token in accordance with yet another embodiment. As shown in FIG. 5, the token 500 includes an interface 505, a processor 510, and memory 515. The interface 505, the processor 510 and the memory 515 may be implemented with an application specific integrated circuit, field programmable gate array, or other similar technologies.

The interface 505 may be configured as communication conduit for data between the token and the security client. The interface 505 may comply with existing smart card interface standards such as ISO 7816, which is hereby incorporated by reference. The processor 510 may be configured to provide a computing platform for the functions of the token. For example, the processor 510 can transfer data, execute applets stored in the memory 515. The memory 515 may be configured to securely store information such as private keys, data, applets (small applications). The memory 515 may be partitioned into blocks 520-524. Accordingly, the token 500 may store a pointer to an URL or a configuration file in the memory 515.

Figure 6:
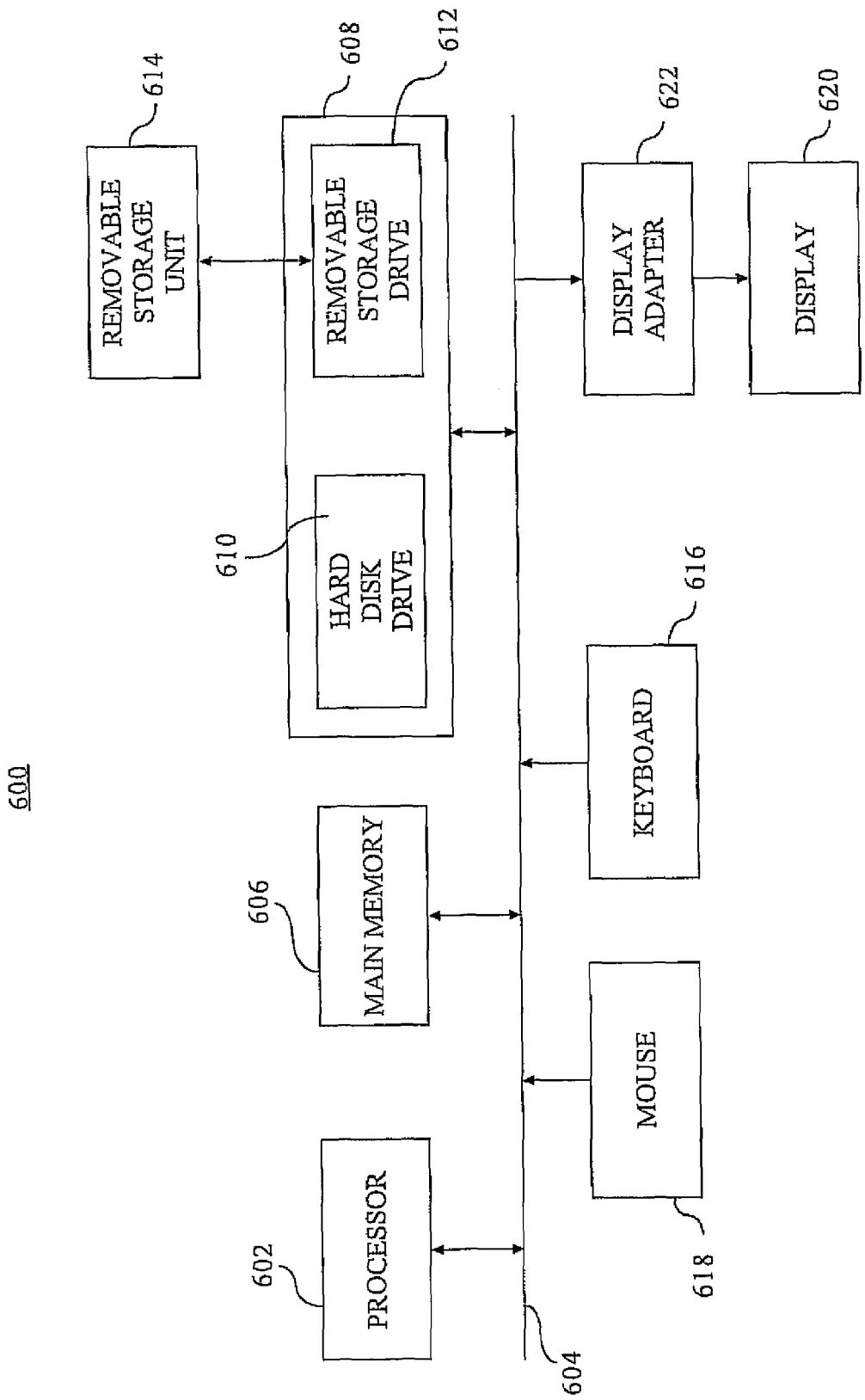
FIG. 6 illustrates an exemplary computing platform.

FIG. 6 illustrates an exemplary block diagram of a computing platform 600 where an embodiment may be practiced. The functions of the security client and certificate management system may be implemented in program code and executed by the computing platform 600. The security client and certificate management system may be implemented in computer languages such as PASCAL, C, C++, JAVA, etc.

As shown in FIG. 6, the computer system 600 includes one or more processors, such as processor 602 that provide an execution platform for embodiments of the security client and certificate management system. Commands and data from the processor 602 are communicated over a communication bus 604. The computer system 600 also includes a main memory 606, such as a Random Access Memory (RAM), where the security client and certificate management system may be executed during runtime, and a secondary memory 608. The secondary memory 608 includes, for example, a hard disk drive 610 and/or a removable storage drive 612, representing a floppy diskette drive, a magnetic tape drive, a compact disk drive, etc., where a copy of a computer program embodiment for the security client and certificate management system may be stored. The removable storage drive 612 reads from and/or writes to a removable storage unit 614 in a well-known manner. A user interfaces with the security client and certificate management system with a keyboard 616, a mouse 618, and a display 620. A display adapter 622 interfaces with the communication bus 604 and the display 620. The display adapter also receives display data from the processor 602 and converts the display data into display commands for the display 620.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   detecting, by a security client, a presence of a token;
   in response to a detection of the presence of the token, determining whether the token is associated with a user;
   in response to a determination that the token is not associated with the user, retrieving, from the token, a reference to an XML formatted configuration file, the configuration file comprising an enrollment network address;
   in response to an execution of the configuration file, retrieving, via a network, an enrollment form from a site referenced by the enrollment network address;
   receiving, in relation to the enrollment form, enrollment data of the user;
   transmitting to the site an enrollment request comprising the enrollment data of the user;
   receiving, by a processor, binding data that is generated in response to the enrollment request and in view of the enrollment data of the user; and
   binding the token to the user by storing the binding data on the token.

2. The method of claim 1, further comprising:
   retrieving information from the site; and
   displaying the information to obtain the enrollment data from the user.

3. The method of claim 1, further comprising:
   receiving a key; and
   retrieving a certificate, the certificate secured by the key.

4. The method of claim 3, further comprising embedding the certificate on the token.

5. A non-transitory computer-readable medium comprising instructions, which, when executed by a processor, cause the processor to:
   detect, by a security client, a presence of a token;
   in response to a detection of the presence of the token, determining, by the processor, whether the token is associated with a user;
   in response to a determination that the token is not associated with the user, retrieve, from the token, a reference to an XML formatted configuration file, the configuration file comprising an enrollment network address;
   in response to an execution of the configuration file, retrieve an enrollment form via a network from a site referenced by the enrollment network address;
   receive, in relation to the enrollment form, enrollment data of the user;
   transmit, to the site, an enrollment request comprising the enrollment data of the user;
   receive binding data that is generated in response to the enrollment request and in view of the enrollment data of the user; and
   bind the token to the user by storing the binding data on the token.

6. A system comprising:
   a memory; and
   a processor, operatively coupled to the memory, to:
   detect a presence of a token,
   determine, in response to a detection of the presence of the token, whether the token is associated with a user,
   in response to a determination that the token is not associated with the user, retrieve, from the token, a reference to an XML formatted configuration file, the configuration file comprising an enrollment network address;
   in response to an execution of the configuration file, retrieve an enrollment form via a network from a site referenced by the enrollment network address;
   receive, in relation to the enrollment form, enrollment data of the user,
   transmit to the site an enrollment request comprising the enrollment data of the user,
   receive, from a certificate server, binding data that is generated in response to the enrollment request and in view of the enrollment data of the user, and
   bind the token to the user that provided the enrollment data by storing the binding data on the token.

7. The system of claim 6, wherein the processor is to receive information from the site and display the information to obtain the enrollment data from the user.

8. The system of claim 6, wherein the certificate server is to provide a secure site for the network address.

9. The system of claim 6, wherein the processor is to form a secure channel to the site referenced by the network address.

10. The system of claim 6, wherein the processor is to retrieve information from the network address to render the retrieved information.

11. The system of claim 6, wherein the processor is to request key generation for the token.

12. The system of claim 11, wherein the processor is to request a certificate to be generated that is secured by a generated key.

13. The system of claim 12, wherein the processor is to embed the certificate in the token.

14. A method comprising:
   embedding a plurality of tokens with a configuration file;
   distributing the plurality of tokens to a set of users;
   detecting, by a security client a presence of at least one token of the plurality of tokens; and
   in response to detecting the presence of the at least one token, executing, by a processor, instructions that direct the security client to:
   determine whether the token is assigned to a user from the set of users,
   in response to a determination that the token is not assigned to the user, retrieve, from the token, a reference to an XML formatted configuration file, the configuration file comprising an enrollment network address, in response to an execution of the configuration file, retrieve an enrollment form via a network from a site referenced by the enrollment network address, receive, in relation to the enrollment form, input from the user of enrollment data, transmit to the site an enrollment request comprising the enrollment data of the user, receive binding data for the token that is generated in response to the enrollment request and in view of the enrollment data of the user, and bind the token to a corresponding user by storing the binding data on the token.

15. The method of claim 14, wherein the instructions further direct the security client to retrieve information from the site and display the information to obtain the enrollment data from the user.

16. The method of claim 14, wherein the instructions further direct the security client to receive a key and retrieve a certificate secured by the key.

17. The method of claim 14, wherein the instructions further direct the security client to retrieve at least one of a name of a card issue, a location of servers, or configuration information.

18. A non-transitory computer-readable medium comprising instructions, which, when executed by a processor, cause the processor to:

embed a plurality of tokens with a configuration file;

distribute the plurality of tokens to a set of users;

detect, by a security client, a presence of at least one token of the plurality of tokens; and in response to a detection of the presence of the at least one token, execute instructions that direct the security client to:

determine whether the token is assigned to a user from the set of users, in response to a determination that the token is not assigned to the user, retrieve, from the token, a reference to an XML formatted configuration file, the configuration file comprising an enrollment network address, in response to an execution of the configuration file, retrieve an enrollment form via a network from a site referenced by the enrollment network address, receive, in relation to the enrollment form, input from the user of enrollment data, transmit to the site an enrollment request comprising the enrollment data of the user, receive binding data for the token that is generated in response to the enrollment request, and in view of the enrollment data of the user, and bind the token to a corresponding user by storing the binding data on the token.

* * * * *